US012659522B2

(12) United States Patent
Hardy

(10) Patent No.: US 12,659,522 B2
(45) Date of Patent: Jun. 16, 2026

(54) EFFICIENT STORAGE OF CONTENT WITH USER-GENERIC COPIES

(71) Applicant: Comcast Cable Communications, LLC, Philadelphia, PA (US)

(72) Inventor: Rocky Hardy, Colorado Springs, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 47 days.

(21) Appl. No.: 18/504,348

(22) Filed: Nov. 8, 2023

(65) Prior Publication Data

US 2025/0150644 A1 May 8, 2025

(51) Int. Cl.
*H04N 21/218* (2011.01)
*H04N 21/258* (2011.01)

(52) U.S. Cl.
CPC ... *H04N 21/2181* (2013.01); *H04N 21/25875* (2013.01)

(58) Field of Classification Search
CPC ..................... H04N 21/2181; H04N 21/25875
USPC .......................................................... 709/224
See application file for complete search history.

(56) References Cited

U.S. PATENT DOCUMENTS

| | | | |
|---|---|---|---|
| 10,719,235 B1 * | 7/2020 | Diaconescu | .......... G06F 3/0665 |
| 10,743,037 B1 * | 8/2020 | Vantalon | .......... H04N 21/23106 |
| 2017/0272792 A1 * | 9/2017 | Bachmutsky | ...... H04N 21/4532 |
| 2023/0109690 A1 * | 4/2023 | Mutha | ................... G06F 9/5083 718/1 |
| 2023/0171442 A1 * | 6/2023 | Babu | .................. H04N 21/2407 725/25 |
| 2024/0256484 A1 * | 8/2024 | Garg | ....................... G06F 16/13 |

* cited by examiner

*Primary Examiner* — Karen C Tang
(74) *Attorney, Agent, or Firm* — BakerHostetler

(57) ABSTRACT

In a method for storing and replaying a content item, a server may receive one or more user requests from user devices to store the content item. The server may determine a quantity of user-generic copies to store and may generate user-generic copies that are not yet assigned to a specific user-account. If a user requests output of the stored content item, the server may associate one of the user-generic copies with the user-account of the user. This process may convert one of the user-generic copies into a user-specific copy for the user-account. The server may send at least a portion of the user-specific copy to a user device that is associated with the user-account.

20 Claims, 8 Drawing Sheets

300

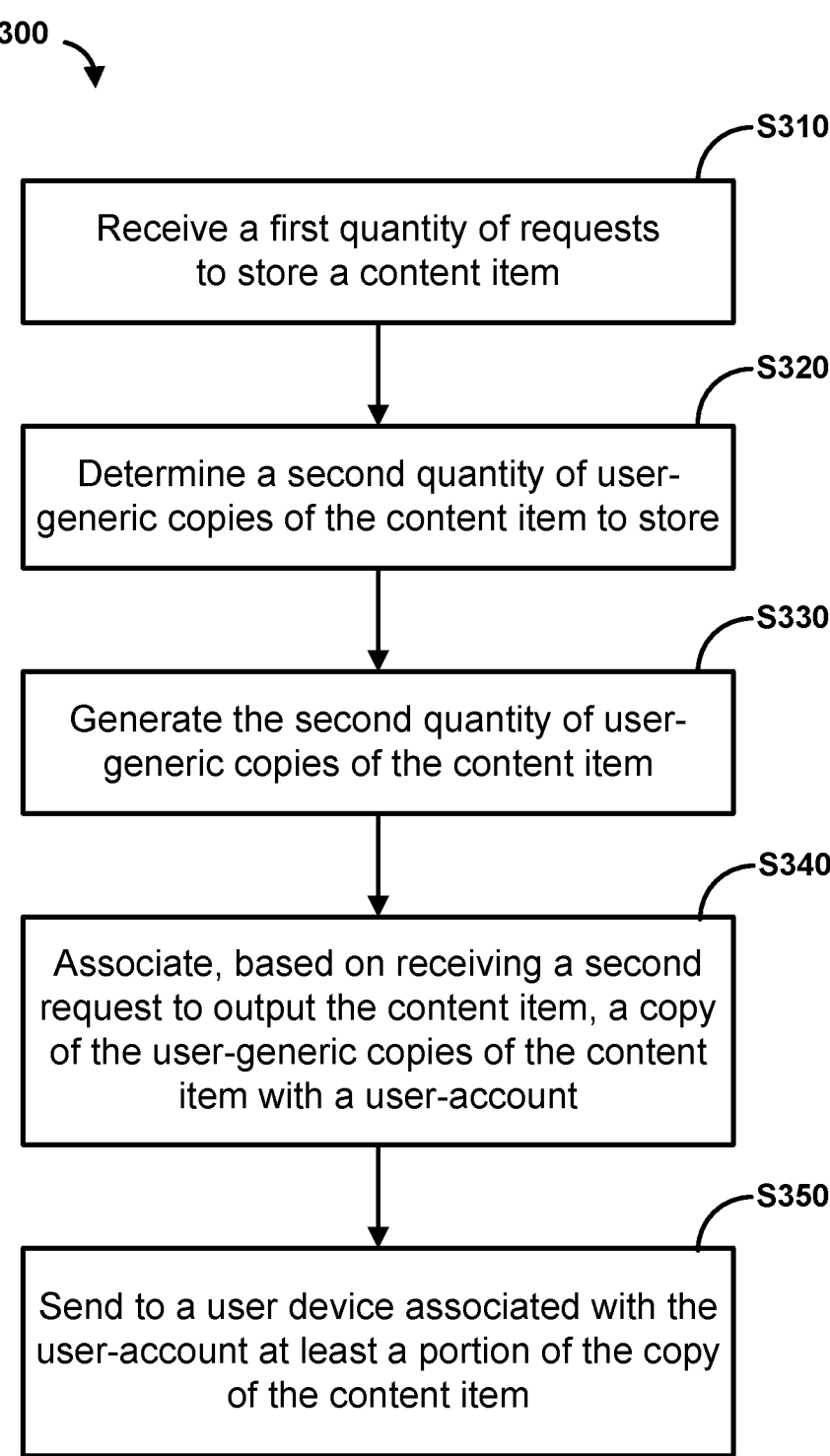

S310

Receive a first quantity of requests to store a content item

S320

Determine a second quantity of user-generic copies of the content item to store

S330

Generate the second quantity of user-generic copies of the content item

S340

Associate, based on receiving a second request to output the content item, a copy of the user-generic copies of the content item with a user-account

S350

Send to a user device associated with the user-account at least a portion of the copy of the content item

FIG. 3

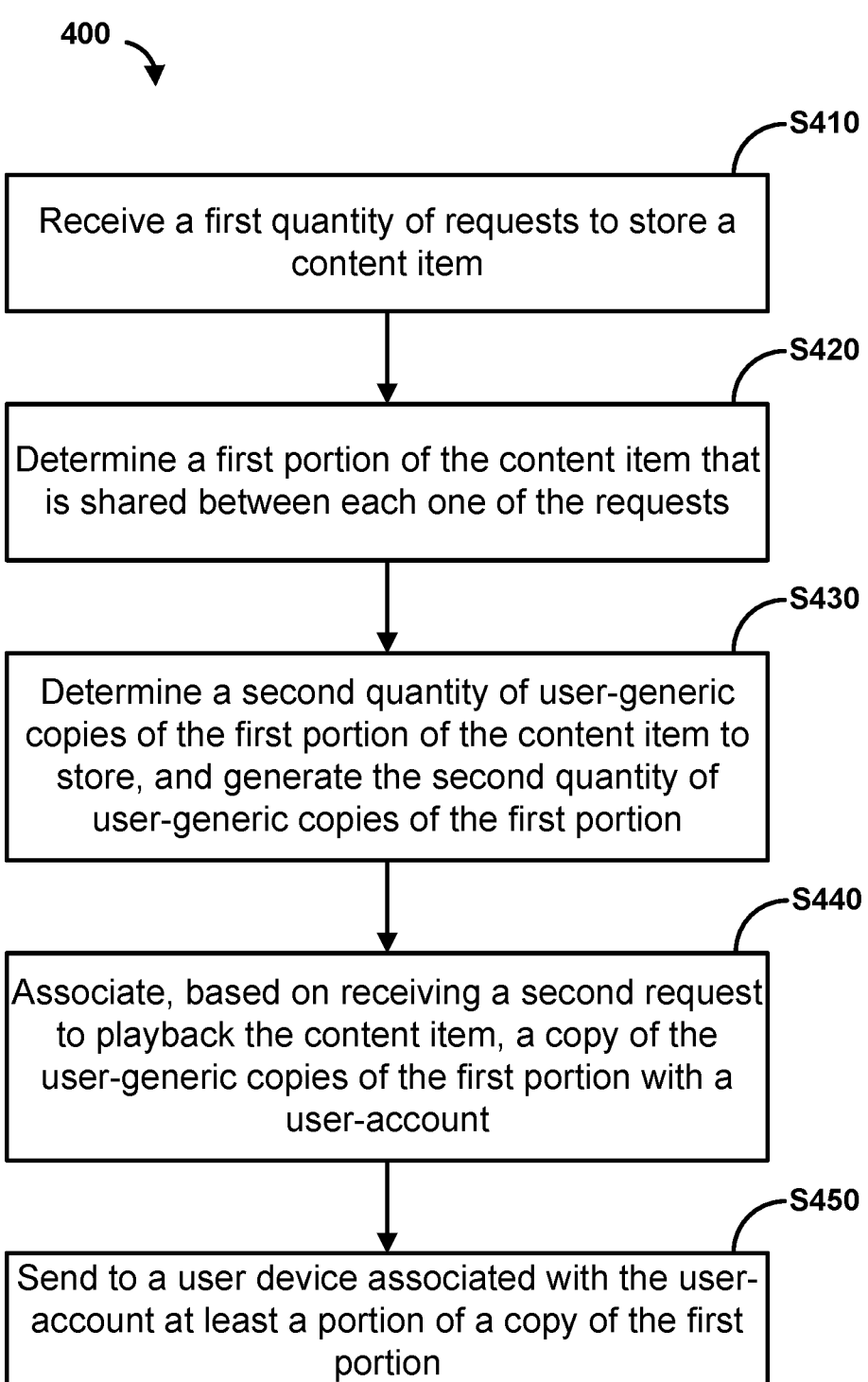

400

S410

Receive a first quantity of requests to store a content item

S420

Determine a first portion of the content item that is shared between each one of the requests

S430

Determine a second quantity of user-generic copies of the first portion of the content item to store, and generate the second quantity of user-generic copies of the first portion

S440

Associate, based on receiving a second request to playback the content item, a copy of the user-generic copies of the first portion with a user-account

S450

Send to a user device associated with the user-account at least a portion of a copy of the first portion

FIG. 4

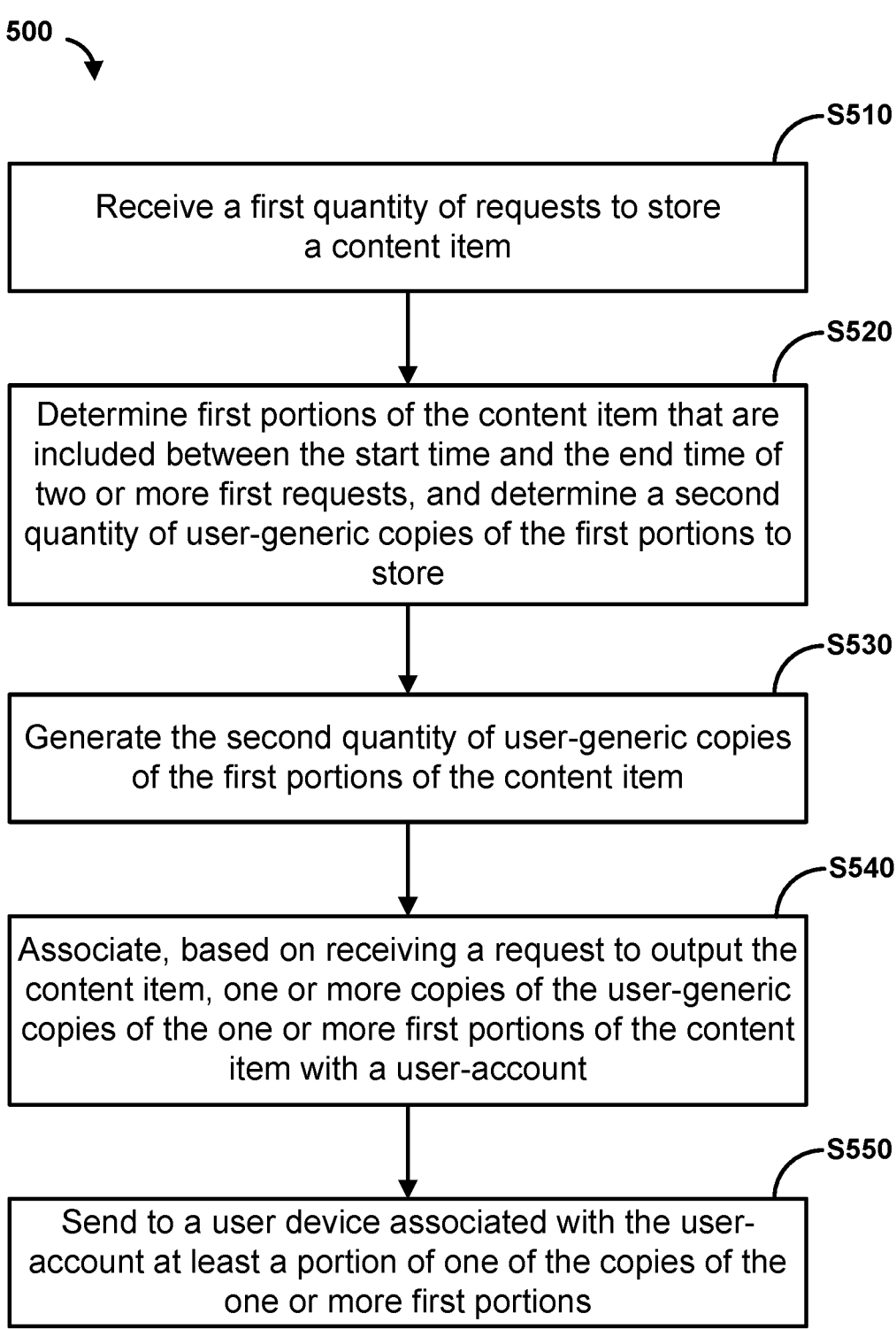

500

S510

Receive a first quantity of requests to store a content item

S520

Determine first portions of the content item that are included between the start time and the end time of two or more first requests, and determine a second quantity of user-generic copies of the first portions to store

S530

Generate the second quantity of user-generic copies of the first portions of the content item

S540

Associate, based on receiving a request to output the content item, one or more copies of the user-generic copies of the one or more first portions of the content item with a user-account

S550

Send to a user device associated with the user-account at least a portion of one of the copies of the one or more first portions

Receive a first quantity of requests
to store a content item

S620

Determine a second quantity of user-
generic copies of the content item to
store, the second quantity being less
than the first quantity

S630

Generate the second quantity of user-
generic copies of the content item

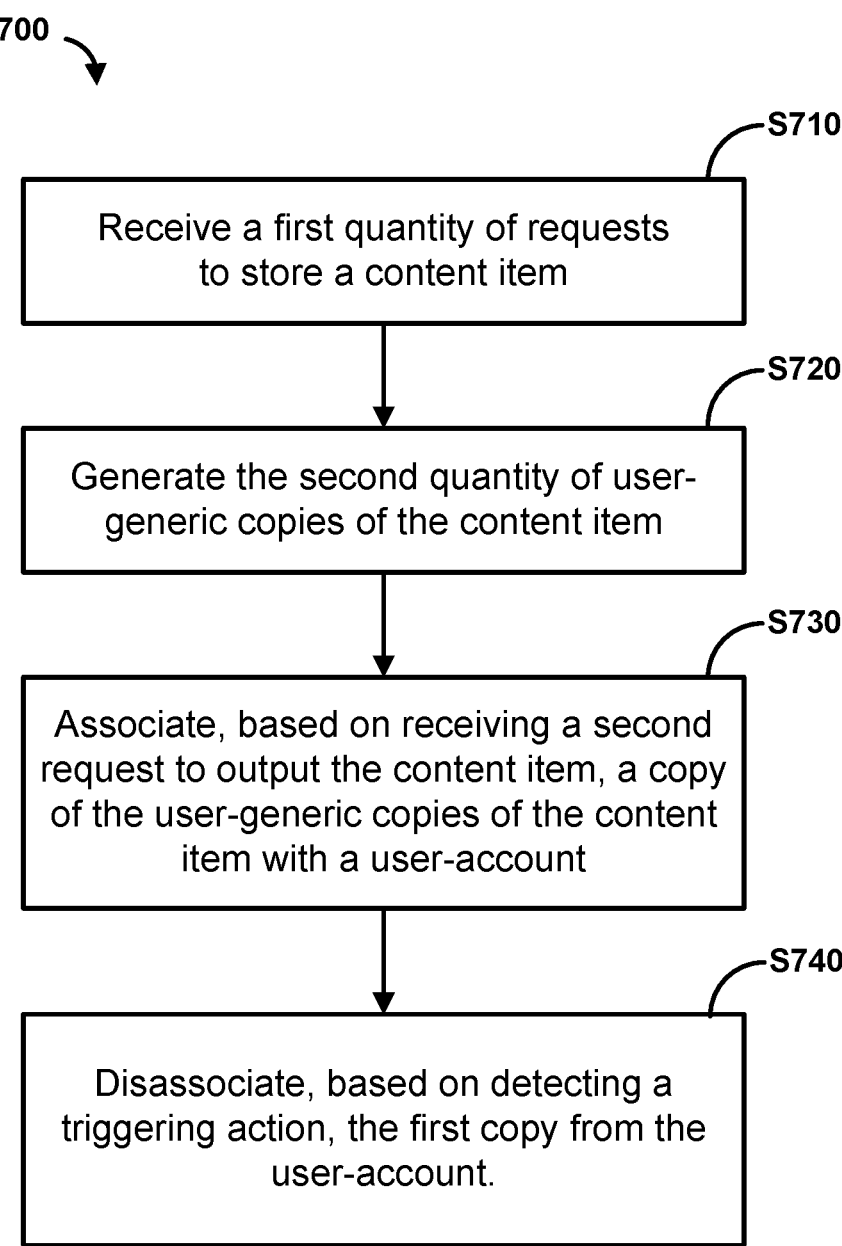

700

S710

Receive a first quantity of requests
to store a content item

S720

Generate the second quantity of user-
generic copies of the content item

S730

Associate, based on receiving a second
request to output the content item, a copy
of the user-generic copies of the content
item with a user-account

S740

Disassociate, based on detecting a
triggering action, the first copy from the
user-account.

FIG. 7

EFFICIENT STORAGE OF CONTENT WITH USER-GENERIC COPIES

BACKGROUND

Because a separate copy of a content item is stored for each user, an amount of storage memory used for the recorded content items from the streamed channels may rapidly increase if the number of users that record (e.g., store) the content items increases. Therefore, it is highly desirable to reduce the amount of storage memory used for the recorded content items.

SUMMARY

Systems and methods are described herein for storing content item by different users and for playing back the content items by different users. A user may request that a content item, such as content streamed on a content channel, be recorded and stored for later access. If a first quantity of users requests the same content item to be stored, a second quantity of user-generic copies of the content item may be stored, at least temporarily. A user-generic copy may be copy intended to be assigned to one of several users requesting recording of a content item, but the user-generic copy may not yet be assigned to a specific user. If a user requests to access the user's copy of the stored content item, one of the user-generic copies of the content item may be associated with and/or otherwise be converted to a user-specific copy assigned to the user. The second quantity of user-generic copies may be less than the first quantity (e.g., the total number) of requests for copies from the users. A prediction may be made regarding how many users will actually access their requested copy of the content in a time period. The second quantity of user-generic copies stored may be determined based on the prediction. The second quantity of user-generic copies (e.g., the prediction) may be determined by a variety of factors, such as thresholds, rules, prediction models, the quantity of users requesting the stored copies, time since the copy was recorded, and/or the like. The second quantity of user-generic copies stored may be dynamically changed over time (e.g., as conditions and predictions change for users accessing the copies).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Certain features of the subject technology are set forth in the appended claims. However, for purposes of explanation, several aspects of the subject technology are depicted in the following figures.

FIG. 3 shows an example method.

FIG. 4 shows another example method.

FIG. 5 shows another example method.

FIG. 7 shows another example method.

DETAILED DESCRIPTION

Figure 1:
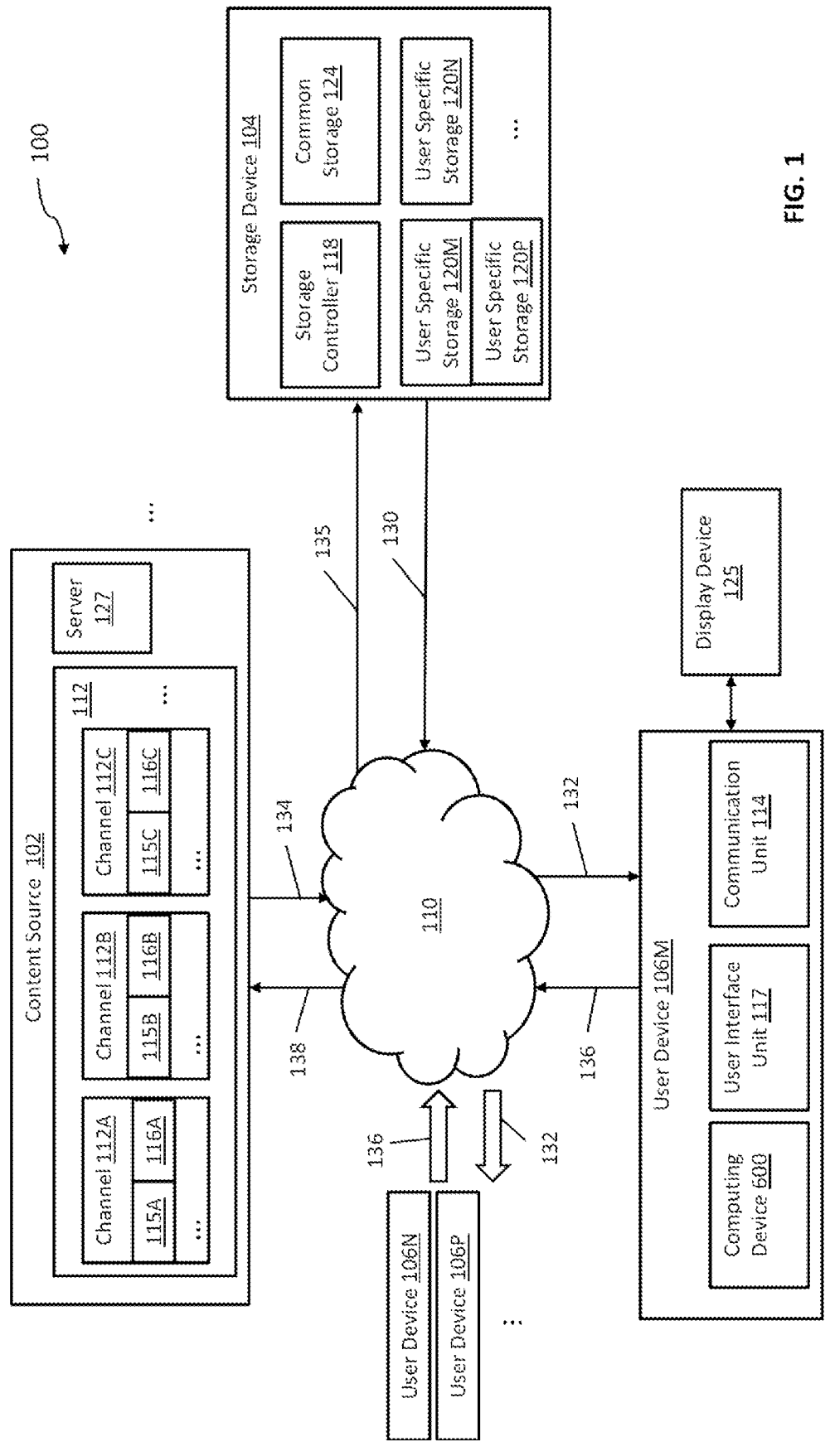
FIG. 1 shows a system for providing a content item.

The present disclosure includes methods and system for copy on demand of content, such as content available via a network based digital video recorder (DVR). The amount of memory used in the network memory, e.g., the cloud network memory or memory associated with the cloud network, drastically increases when a separate copy is stored for each request. To reduce the use of memory, it may be assumed that all of the users may not request output (e.g., playback, rendering, access, download) at the same time. Some users, despite requesting storage of a copy a content item, may seldom or never request output of the copy. Thus, a quantity of copies of the content item may be stored that may be fewer than the actual quantity requested. Unlike conventional approaches, the present techniques may use predictions to determine how many users are likely to access the requested copies. The quantity of copies stored may be based on the prediction. The prediction (e.g., and the number of copies stored) may be based on historic usage data, predictive models, rules, and/or the like. For example, historic usage data may be generated per user, genre of the content item, duration of the content item, quality (HD or not HD) of the content item, and/or the like. Based on the historic usage data, the quantity of copies to be produced for a content item determined. The prediction may be specific to the group of users requesting copies of the same content item. For example, if the group has a larger amount of users who do not typically watch the recordings requested, then the number of copies stored may be smaller than for a group that has a higher percentage of watched recordings. The prediction may change over time. For example, as time progresses further from the original recording time of the content, the prediction of users accessing the copies may decrease, resulting in a lower number of stored copies. Each of users may have historic pattern of when they watch recordings (e.g., or certain types of recordings). The historic patterns may be used to determine probabilities for each hour of a day over the period of one or more weeks. For example, the historic patterns may be combined to determine a predicted pattern for the group of users requesting the recording.

A user, e.g., the requester, may have an associated user account. The user may request storing of a content item when the user is logged in using credentials associated with the account. The user-data for storing content items and output of the content item, the genre of the content item, the duration of the content item and the requested quality of the stored content item, and etc. may be stored and associated with the user-account. The user-data of one or more of a first quantity of users requesting storage of the content item may be used for determining a second quantity of copies of the content item to be produced. The copies of the content item may initially be unassigned (e.g., user-generic copies), and may be assigned to a specific user when a user sends a request for output (e.g., playback, rendering, access, download) of the copy of the content item. In some scenarios, a copy of a content item from the unassigned copies may become permanently (e.g., until expiration or deletion of the copy) assigned to (e.g., or associated with) the user. In other scenarios, the copy of content item may be temporarily assigned to the user. The temporarily assigned copy may become unassigned (e.g., or unassociated with the user)

when the user completes the output of the content item, provides a command to delete a copy, and/or the like. The number of user-generic copies may periodically be updated based on received requests, network conditions, storage conditions, timing schedules, predictions, rules, and/or other features.

FIG. 1 is a block diagram showing a system 100 for providing (e.g., storing and playing back) a content item. The system 100 may include one or more of a content source 102, a storage device 104, and one or more of a user device 106. The content source 102, the storage device 104, and the user device 106 may be communicatively coupled via a network 110, e.g., a cloud network. The system 100 may have multiple content sources 102 and multiple storage devices 104.

The network 110 may include a content distribution and/or access network. The network 110 may facilitate communication via one or more communication protocols. The network 110 may include fiber, cable, or a combination thereof. The network 110 may include wired links, wireless links, a combination thereof, and/or the like. The network 110 may include routers, switches, nodes, gateways, servers, modems, and/or the like.

The content source 102 may send, via the network 110, content 112 to a plurality of user devices 106M, 106N, 106P, and etc., such as live channels, streaming channels, cable channels, and/or the like. The content 112 may include one or more content items from content channels 112A, 112B, 112C, or etc. The content 112 may include content items 115A, 115B, 115C, 116A, 116B, 116C, or etc., such as video data, audio data, closed caption (CC) data, a combination thereof, and/or the like. A content item may comprise a program (e.g., show, movie, episode, newscast, sportscast) or portion thereof delivered via a content channel. The content source 102 may include one or more servers 127. The content source 102 may comprise one or more edge devices of a content distribution network and/or content access network. The content source 102 may comprise (e.g., included in the server 127) a transcoder to encode, encrypt, compress, and/or the like the content. The content source 102 may comprise (e.g., included in the server 127) a packager to package the content, segment the content, and/or the like. The content source 102 may send the content as a plurality of packets, such as transport stream packets, Moving Picture Experts Group (MPEG) transport stream packets, and/or the like. The content source 102 may send the content items 115A, 115B, 115C, 116A, 116B, 116C, or etc., to the storage device 104 to be stored. The server 127 may send the content items 115A, 115B, 115C, 116A, 116B, 116C, or etc., via a communication link 134, the network 110, and a communication link 132 to the user devices 106M, 106N, 106P, etc. The server 127 may send the content items 115A, 115B, 115C, 116A, 116B, 116C, or etc., in response to a request for content items (e.g., or a request to store a content item) by the user devices 106M, 106N, 106P, and etc., that is received via a communication link 136, the network 110, and a communication link 138.

In addition, the user devices 106M, 106N, 106P, or etc., may receive one or more of the stored, e.g., recorded, content items 115A, 115B, 115C, 116A, 116B, 116C, or etc., from the storage controller 118 of the storage device 104 via the communication link 130, the network 110, and the communication link 132. The storage controller 118 may send one or more of the stored content items 115A, 115B, 115C, 116A, 116B, 116C, or etc., in response to a request for content items (e.g., or a request for a stored copy of the content item) by the user devices 106M, 106N, 106P, or etc.

The request may be received via the communication link 136, the network 110, and/or a communication link 135.

The storage device 104 may comprise a common storage 124. The storage device may comprise user-specific storages 120M, 120N, 120P, etc., that may be associated with (e.g., assigned to, linked to) separate user-accounts. The stored content items 115A, 115B, 115C, 116A, 116B, 116C, or etc., may be stored in response to corresponding requests by each one of the user devices 106M, 106N, 106P, and etc. The stored content items 115A, 115B, 115C, 116A, 116B, 116C, or etc. may be stored in separate user-specific storages 120M, 120N, 120P, or etc. that may be associated with the separate user-accounts. The common storage 124 is described with respect to FIG. 2A. In some scenarios, a user-specific storage may be or become unassigned to any specific user. The user-specific storage may become associated with a user upon certain actions, such as if user requests access to a copy of a content item, if a user requests a recording after the content already started streaming (e.g., and a copy is already being recorded), and/or the like. In other scenarios, a copy may be moved to a user-specific storage area associated with a user account if the user requests output of a copy of a content item.

The user devices 106M, 106N, 106P, and etc., may receive stored copies of the content items 115A, 115B, 115C, 116A, 116B, 116C, etc., from one or more of the content sources 102 or the storage device 104. The user devices 106M, 106N, 106P, and etc., may each comprise a computing device (e.g., such as the computing device 800 of FIG. 8) that includes a processor and memory. The computing device may comprise a smart device (e.g., smart glasses, smart watch, smart phone), a mobile device, a tablet, a computing station, a laptop, a digital streaming device, a set-top box, a streaming stick, a television, and/or the like.

The user devices 106M, 106N, 106P, and etc., may comprise a communication unit 114 and may receive the content items 115A, 115B, 115C, 116A, 116B, 116C, or etc., via the communication link 132 by the communication unit 114. The communication unit 114 may include a modem, network interface, and/or the like for communication via the network 110. The user devices 106M, 106N, 106P, or etc., may comprise a user interface unit 116. The user interface unit 117 may cause a display of the stored copies of the content items 115A, 115B, 115C, 116A, 116B, 116C, or etc., received by the communication unit 114. The user interface unit 117 may allow a user to browse available content, such as content sent by the content source 102, content stored by the storage device 104, and/or the like on a display device 125 that is included or is coupled to the user device 106M, 106N, 106P, or etc. The user interface unit 117 may allow users to request content, such as a content channel (e.g., or a content item being supplied via the content channels 112A, 112B, 112C, or etc.), be stored (e.g., recorded) for later viewing. A request to store the content items 115A, 115B, 115C, 116A, 116B, 116C, or etc., may be sent by the user interface unit 117 via the communication link 136 to the network 110 and via the communication link 136 to the storage device 104. The storage may be based on a configuration setting, such as a buffering setting associated with buffering content in storage. The user interface may comprise an indication of a stored copy of content (e.g., even though no actual copy is assigned to the user yet).

The storage device 104 may store content items 115A, 115B, 115C, 116A, 116B, 116C, or etc., that may be segments from the content channels 112A, 112B, 112C, or etc. The storage device 104 may store the content items 115A, 115B, 115C, 116A, 116B, 116C, or etc., for a plurality of users. The storage device 104 may include a storage controller 118 to store and/or manage storage of the content items 115A, 115B, 115C, 116A, 116B, 116C, or etc. The storage device 104 may send the stored content items 115A, 115B, 115C, 116A, 116B, 116C, or etc., (e.g., after reconstituting the content items) upon requests from the user device 106M, 106N, 106P, or etc. The storage device 118 may send and receive communication signals, e.g., a request, or send and receive data via the communication link 130 and the communication link 135.

The storage controller 118 may subdivide (e.g., deconstruct, divide) content items 115A, 115B, 115C, 116A, 116B, 116C, or etc., into a plurality of portions for storage. Subdividing may include separating data into separate blocks, copying a single block as multiple separate blocks, and/or the like. The storage device 104 may receive the content items 115A, 115B, 115C, 116A, 116B, 116C, or etc., from the content source 102. The content items 115A, 115B, 115C, 116A, 116B, 116C, or etc., may be received as a plurality packets, such an internet protocol packets, transport stream packets, and/or the like. A packet may comprise one or more sections (e.g., segments, frames, blocks) of the content items 115A, 115B, 115C, 116A, 116B, 116C, or etc. A section of the content items 115A, 115B, 115C, 116A, 116B, 116C, or etc., may include a plurality of frames of the content items 115A, 115B, 115C, 116A, 116B, 116C, or etc. The storage controller 118 may subdivide a section of the content items 115A, 115B, 115C, 116A, 116B, 116C, or etc., and/or a frame of the content items 115A, 115B, 115C, 116A, 116B, 116C, or etc., into the plurality of portions. The storage controller 118 may subdivide each section of the content items 115A, 115B, 115C, 116A, 116B, 116C, or etc., into a corresponding plurality of portions of the content items 115A, 115B, 115C, 116A, 116B, 116C, or etc. The storage controller 118 may subdivide the content items 115A, 115B, 115C, 116A, 116B, 116C, or etc., on a per user basis. The storage controller 118 may be configured to subdivide the content items 115A, 115B, 115C, 116A, 116B, 116C, or etc., such that the plurality of portions are different or the same for different users (e.g., for the same content item).

The storage controller 118 may be configured to subdivide the content items 115A, 115B, 115C, 116A, 116B, 116C, or etc., multiple times. The content items 115A, 115B, 115C, 116A, 116B, 116C, or etc., (e.g., or segment and/or section of a content item) may comprise header data and media (e.g., video, audio, bit stream) data. The content item (e.g., or segment and/or section of a content item) may be subdivided into a header portion comprising the header data and a media portion comprising the media data (e.g., video data). The media portion may be subdivided into a first portion (e.g., a user-specific portion) and a second portion (e.g., remaining portion, common portion). For each subdivided section (e.g., which may include a segment of content, or portion thereof) of the media portion, a plurality of first portions may be stored (e.g., each in a separate user storage area (or user-generic storage area, user-specific storage area) which will later become associated with a specific user). For each subdivided section, a single second portion may be stored (e.g., in common storage accessible to a plurality of users). Each of the plurality of first portions may separately be combined with the second portion to reconstitute the subdivided section (e.g., for a specific user). A plurality of first portions may be stored. The plurality of first portions may be user-generic portions as described herein, each representing a potential user-specific portion that is not yet assigned to a particular user. The quantity of first portions stored may be determined as described further herein, such as by predicting a quantity of copies needed based on the number of users requesting storage of a copy (e.g., along with other factors). The quantity of first portions stored may change over time (e.g., due to changing predictions). If a specific user is assigned to one of the first portions (e.g., when a user requests output, or other trigger), the first portion may become a user-specific portion associated with the specific user. The user-specific portion may remain associated with the specific user. In some scenarios (e.g., if the user indicates deletion of the copy), the user-specific portion may become unassociated with the specific user and become a user-generic portion.

Figure 2C:
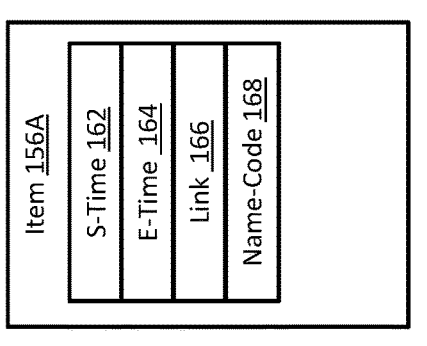
FIG. 2C shows an example content data item.
Figure 2B:
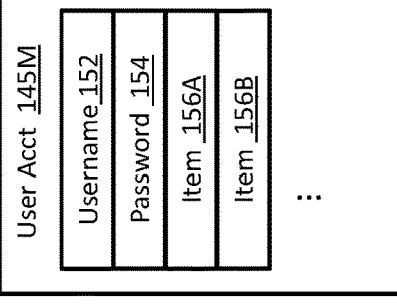
FIG. 2B shows example user account data.
Figure 2A:
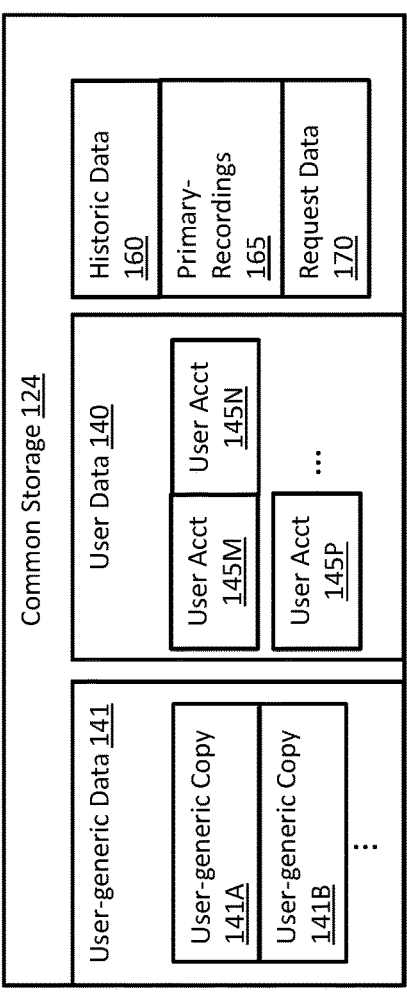
FIG. 2A shows an example common storage.
Figure 2D:
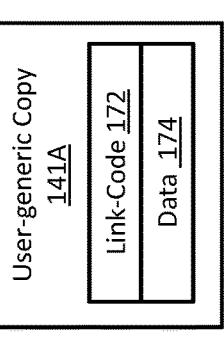
FIG. 2D shows an example user-generic copy of a content item.

FIGS. 2A, 2B, 2C, and 2D illustrate memory contents of one or more storage devices of an example operating environment, according to various aspects of the subject technology. FIG. 2A shows that the common storage 124 may comprise a user-generic data storage 141, a user data storage 140, a historic-data storage 160, a primary-recordings storage 165, a request-data storage 170, or any combination thereof. The user-generic data storage 141 may include none, one, or more user-generic copies 141A, 141B, 141C, or etc., that are a whole or partial copies of the content items 115A, 115B, 115C, 116A, 116B, 116C, or etc. The user-generic copies 141A, 141B, 141C, or etc., at least temporarily, may not be associated with (e.g., assigned or linked to) any user-account but instead may be unassigned. However, the user-generic copies may be restricted such that the user-generic copies may only be accessed by one account at a time, such as by associating the user-generic copy with a user account (e.g., thereby converting the copy to a user-specific copy). As shown in FIG. 2D, the user-generic copies (e.g., the user-generic copy 141A) may include link-code data 172 and a data segment 174. In some scenarios, the link-code data 172 may be stored separately from the user-generic copies. When the link-code data 172 is blank, e.g., null, the user-generic copies 141A is not assigned to a user-account. Otherwise the link-code data 172 may comprise a link to a user-account or may comprise a code that represents the user-account. The link-code data 172 may also comprise a link (e.g., or identifier, resource identifier, account identifier, association with an account) to a user-specific copy, described below, that is in a user-specific storage 120M, 120N, 120P, or etc. The data segment 174 may comprise a whole or partial copy of the one of the content items 115A, 115B, 115C, 116A, 116B, 116C, or etc.

The user data storage 140 may include user-accounts and may have user account data 145M, 145N, 145P, and etc. The user account data is shown in FIG. 2B. As shown the user account data 145M may comprise a username section 152 and a password section 154 that may be used by the storage controller 118 to authenticate a user or a user device. The user account data 145M may comprise one or more content data items 156A, 156B, 156C, or etc (e.g., data indicating one or more content items stored for a user). The content data items may be data about one or more of the content items 115A, 115B, 115C, 116A, 116B, 116C, or etc., stored in storage device 104. The content data items may comprise a reference to a copy of a content item. The content data items may comprise data for generating a copy of a content item, such as a start time, duration, and/or end time associated with a recording. As shown in FIG. 2C, each one of the content data item 156A, 156B, 156C, or etc., may include a start time, S-Time 162, and an end time, E-Time 164, from a beginning of one of the content items that is requested to be stored. The content data item 156A, 156B, 156C, or etc., may also include a link 166 to a copy of the content item and a name-code 168 of the content item. The link may be blank, e.g., null, and refer to one of the user-generic copies 141A, 141B, 141C, or etc. The link may not be null and may refer to an address of a user-specific copy in the user-specific storage 120M, 120N, 120P, or etc. The content data items may be used to trim, edit, and/or select all or a portion of a user-generic copy to convert the user-generic copy into a user-specific copy.

A great amount of storage memory in the storage device 104 may be saved if as described in detail below, instead of storing a copy of the content item per user request, only a quantity less than the quantity of requests of copies of the content item 115A, 115B, 115C, 116A, 116B, 116C, or etc., is stored in the user-generic data storage 141. A first quantity of requests to stored copies of a content item may be received, but a second quantity of copies of the stored content item may actually be stored. The second quantity of copies may be determined based on the first quantity of requests to store the content item, a genre of the content item, a duration of the content item, a quality of the content item, e.g., a requested quality (e.g., high definition, ultra-high definition) for the content item, a history of output (e.g., playback, rendering, access, download) by the requesters, and etc. The second quantity copies may be user-generic copies that are not assigned to a user-account, at least when the copies are generated. The user-generic copies may be converted to user-specific copies. For example, the user-generic copies may be or become assigned to a user-account (e.g., if a user requests to output a recorded copy of the content item). The assignment may be removed when the user of the user-account completes output of the stored content item, gives a command to delete the stored content item, the copy expires after a threshold amount of time, and/or the like.

The user-generic copies may be converted to user-specific copies in a variety of ways. For example, association of a user-generic copy with a user account may convert a user-generic copy to a user-specific copy. A user-specific copy may be undecodable and/or inaccessible by user devices not associated with the user account. For example, a user-specific copy may be stored in a user-specific storage area that is associated with the user account and/or restricted to the user account. Other accounts may not have permission to access the user-specific storage area. The user-specific copy may be subdivided into different portions (e.g., which may be stored in different locations, such as user-specific and/or common storages areas). Information may be needed by a user account to reconstitute the user-specific copy from the different portions. The information may become accessible to a user account that becomes associated with a user-specific copy. The information may be added to a user-specific storage area associated with the user-account and/or a user-specific storage area comprising the information may be made available to the user account (e.g., while other user accounts do not have the information available.

If a determination is made that a user-specific copy is no longer to be associated with a user (e.g., due to finishing output, receiving a command, or expiring after a time period), then the user-specific copy may be deleted, converted to a user-generic copy, and/or the like. Conversion of a user-specific copy to a user-generic copy may comprise dissociating the user-specific copy from a user. Dissociating the user-specific copy from the user may comprise removing user account information (e.g., a link-code) from the user-specific copy. Dissociating the user-specific copy from the user may comprise deleting and/or updating an entry in a database associating the user-specific copy with a specific user may be deleted and/or updated to remove information indicating the user account. Dissociating the user-specific copy from the user may comprise removing the user-specific copy from a user-specific storage area associated with the user account. Dissociating the user-specific copy from the user may comprise removing access by a user account to a user-specific storage area comprising the user-specific copy user account information.

The second quantity of copies may periodically redetermined, e.g., after a threshold time period (e.g., 1 hour, 6 hours, 24 hours, and/or the like), based on the frequency of the requests and/or other data described above, and the second quantity of user-generic copies may be increased or decreased. Prior to generating the user-generic copies, a primary recording of each content item may be generated and stored in the primary-recordings storage 165 of the common storage 124, which is a memory storage associated with the content source 102. The content items may be based on a streaming channel. The user-generic copies may be generated based on the primary recordings. If a threshold number of users are predicted to watch only a certain portion of the content item (e.g., less than the full content item), then, at least a portion of the user-generic copies may be limited to (e.g., include only the specific content fragments), the portion of the content item.

The network 110 (e.g., a processor of the network 110), or a combination of the server 127 of the content source 102 and the storage controller 118 of the storage device 104 may keep track of request-data associated with the requests to store the content items and the requests to output the stored content items. The request-data may be stored in the request-data storage 170 of the common storage 124. The request-data may include the information of the user-account of the requester, the frequency of the requests to store content items, the genre of the content items, the duration of the content items, the frequency of the requests to output the store content items, the quality of the content item, and/or the like.

The request-data in the request-data storage 170 may periodically be analyzed to generate a historic-data for storing content items or output of the content items, a historic-data for each user-account to store or to output content items, and a historic-data per genre, duration, or quality for storing the content items or to output the content items (e.g., historic usage data). The historic-data may be stored in historic-data storage 160. The historic-data may be generated and periodically updated by the storage controller 118. The storage controller 118 may use the historic-data to determine the number of user-generic copies of each content item.

When a user requests storing the whole or a part of the content item 115A, 115B, 115C, 116A, 116B, 116C, or etc., a content data item, such as the content data item 156A, may be associated with a user-account, such as user account 145M. If the user requests output of one of the stored content items 115A, 115B, 115C, 116A, 116B, 116C, and etc., the request may be sent via the communication link 136, the network 110, and the communication link 135 to the storage controller 118. The request may be generated by the communication unit 114 and sent through the user interface unit 117. The storage controller 118 may verify that the user has already stored a copy of the content item by checking the user-account to find an item matching the content item. The storage controller 118 may also verify the user by asking the user to login or relogging to the user-account to verify the user-account by verifying the username and password. After verifying the user-account and matching the content item is stored by the user, the storage controller 118 may determine the S-Time 162, and the E-Time 164 from the item, e.g., from the content data item 156A of the user account 145M. Then the storage controller 118 may select all or a portion of one of the user-generic copies, e.g., user-generic copy 141A, of the content item from the user-generic data storage 141.

The storage controller 118 may truncate (e.g., physically trim or virtually by applying restrictions) the user-generic copy between S-Time 162 and the E-Time 164 to generate a user-specific copy. The user-specific copy may be stored in a user-specific storge, e.g., the user-specific storage 120M or in the user-generic data storage 141 of the common storage 124. The storage controller 118 may update the link-code data 172 by adding a code or by a link directed to the user-specific copy or to the user-account to indicate that the user-generic copy is assigned to a user-account. The storage controller 118 may send, e.g., transmit, the user-specific copy via the communication link 130, the network 110, and the communication link 132 to a user device, e.g., the user device 106M. The storage controller 118 may truncate the user-generic copy between S-Time 162 and the E-Time 164 and may generate the user-specific copy during the transmission. The user-specific copy may be received by the communication unit 114 through the user interface unit 117 of the user device.

In another method, the network 110 or a combination of the server 127 of the content source 102 and the storage controller 118 of the storage device 104 may determine a first portion of the content item that is requested to be stored. The first portion of the content item may be shared between each one of the requests for storing that is received. A primary recording, e.g., copy, of the content item is generated and stored in the primary-recordings storage 165. Based on first quantity of requests for storing that included the first portion of the content item in the request, a second quantity of user-generic copies of the first portion of the content item may be determined, generated based on the primary recording, and/or stored in the user-generic data storage 141 of the common storage 124. Thus, the first portion of the content item may be between the S-Time 162 and the E-Time 164 of each request to store the content item. The second quantity of user-generic copies may also be determined based on a prediction of how many users will request to output a copy of the content item during a given time period (e.g., at the same time, during a two hour period, etc). The prediction may be lower than the number of users who actually requested to store a copy of the content item. The prediction may be based on a variety of information, such as the number of users requesting to store the content item, historic-data (e.g., history per user, per genre, per program, per any other demographic), duration (e.g., length of the content item), the requester (e.g., how often the requester to store sends the output request), quality of storing, or any combination thereof. The prediction may be based on inputting information (e.g., as the info listed above) into a model, such as a machine learning model trained to predict quantities of users that will request access to the copies. For each request to store, a second portion of the content item that is between the S-Time 162 and the E-Time 164 and is not part of the first portion may be stored in a user-specific storage, e.g., the user-specific storage 120M. The second portion of the content item may be copied based on the primary recording. The number of user-generic copies may periodically be updated as described above. The user-generic copies may be at least temporarily, e.g., at the beginning or as described above, are unassigned. The user-generic copies may be associated with (e.g., as potential copies for the user) a plurality of users predicted to access the copies.

As described above, if a user requests storing the whole or a part of the content item 115A, 115B, 115C, 116A, 116B, 116C, or etc., a content data item such as the item156A may be added to the user-account. If the user requests output of one of the stored content items 115A, 115B, 115C, 116A, 116B, 116C, and etc., the request may be sent via the communication link 136, the network 110, and the communication link 135 to the storage controller 118. The storage controller 118 may verify that the user has already stored a copy of the content item. The storage controller 118 may also verify the user. After verifying the user-account and matching the content item is stored by the user, the storage controller 118 may determine the S-Time 162, and the E-Time 164 from the item. The storage controller 118 may select one of the user-generic copies of the first portion of the content item from the user-generic data storage 141 of the common storage 124 and select the second portion of the content item from the associated user-specific storage. The storage controller 118 may combine user-generic copy of the first portion and the copy of the second portion and generate a user-specific copy of the content item as described above. The storage controller 118 may update the link-code data 172 by adding a code or by a link directed to the user-account to indicate that the user-generic copy is assigned to a user-account. The storage controller 118 may send the user-specific copy via the communication link 130, the network 110, and the communication link 132 to a user device, e.g., the user device 106M.

In another method, the network 110 or a combination of the server 127 of the content source 102 and the storage controller 118 of the storage device 104 may determine one or more first portions of the content item that is requested to be stored. The one or more first portions of the content item may be included between the start time and the end time of two or more requests to store the content item. Based on the quantity of requests to store and other data as described above the quantity of user-generic copies of the one or more first portions may be determined and are generated. The quantity of user-generic copies of the one or more first portions may be periodically updated based on a quantity of requests to store, the quantity of requests to output, and/or other data as described above. The user-generic copies of the one or more first portions of the content item may be generated and stored in the user-generic data storage 141 of the common storage 124. The user-generic copies may be at least temporarily, e.g., at the beginning or as described above, unassigned to any user accounts. The number of user-generic copies may periodically be updated as described above. For each request to store a content item, a second portion of the content item that is between the S-Time 162 and the E-Time 164 and is not part of the one or more first portions may be stored in a user-specific storage, e.g., the user-specific storage 120M. The second portion of the content item may be copied based on the primary recording. The number of user-generic copies may periodically be updated as described above. The user-generic copies may be at least temporarily, e.g., at the beginning or as described above, unassigned to a user account.

As described above, when a user requests storing the whole or a part of the content item, one or more content data items such as the 156A may be associated with the user-account such that each item corresponds to one of the first portions. When the user requests output of one of a stored content items, the storage controller 118 may verify that the user has already stored a copy of the content item. The storage controller 118 may also verify the user. After verifying the user-account and matching the content item is stored by the user, the storage controller 118 may get the S-Time 162, and the E-Time 164 from the item. The storage controller 118 may select one of the user-generic copies of each one of the one or more first portion of the content item from the user-generic data storage 141 of the common storage 124 and get the second portion of the content item from the associated user-specific storage. The storage controller 118 may combine user-generic copies of the one or more first portions and the copy of the second portion and generate a user-specific copy of the content item as described above. The storage controller 118 may update the link-code data 172 by a code, identifier, and/or by a link directed to the user-account to indicate that the user-generic copies are associated with a user-account. The storage controller 118 may send the user-specific copy via the communication link 130, the network 110, and the communication link 132 to a user device, e.g., the user device 106M. The content item may include content of a streaming channel for a day or a part of the day. Different users may request storing of portions of the streaming channel during the day or part of the day. As described above, the one or more first portions that are shared between two or more users are determined. The number of user-generic copies may be determined as described above and may be stored in the user-generic data storage 141 of the common storage 124. The second portions of the content item that is between the S-Time 162 and the E-Time 164 and is not part of the one or more first portions may be stored in a user-specific storage, e.g., the user-specific storage as described above. A content item may not include all of the first portions or even one of the first portions. The content item may not have a second portion. In response to a request for output the content item, the one or more first portions and the second portion may be combined to reproduce a user-specific content item.

FIG. 3 illustrates a block diagram 300 of method for providing content. The method may comprise storing content items for copy on demand of CDVR, according to various aspects of the subject technology. The block diagram 300 may be used for storing content items and playing back the content item. The method may be used for storing and playing back content items from streaming content channels. The block diagram 300 may be implemented by the any combination of one or more devices of system 100.

At step S310, a first quantity of requests to store a content item may be received. The requests may be sent by a user device, e.g., a user device 106M, 106N, 106P, or etc. The requests may be received by the storage controller 118 of the storage device 104. Each one (or one or more) of the requests to store the first content item may be associated with a user-account (e.g., a corresponding user-account that provided the request). Each one (or one or more) of the requests to store the first content item may comprise a first time to start the storing of the first content item, a second time to end the storing of the first content item, a requested quality of the first content item, or any combination thereof.

At step S320, a second quantity of user-generic copies of the content item to be stored may be determined. The determination may be done by the storage controller 118. The determination may be based on the first quantity of requests as described above in more details. Determining the second quantity of the user-generic copies may be based on one or more of a requested quality of the first content item, a duration of the first content item, usage history, demographics, content information, network information, or a combination thereof. The second quantity of the user-generic copies of the first content item may be periodically updated.

At step S330, the second quantity of user-generic copies of the content item may be generated by the storage controller 118. The first content item may be based on (e.g., recorded from) a streaming channel. For example, the first content item may comprise a show, program, movie, sportscast, newscast, and/or the like. A primary recording of the first content item may be generated. The second quantity of the user-generic copies may be generated based on the primary recording. The second quantity may be updated from time to time. The second quantity may be updated based on a triggering action, additional received requests, network conditions, storage conditions, timing schedules, predictions, rules, and/or other features.

The user-generic copies may be stored in the user-generic data storage 141 of the common storage 124. The user-generic copies may not be assigned yet to a specific user account and may be assigned later based on a request for output (e.g., playback, rendering, access) associated with a user account. The requests to store the first content item and the request to output the first content item may be received by a content source. The second quantity of the user-generic copies of the first content item may be stored in a storage memory associated with the content source. User-accounts may be stored in the storage memory of (e.g., or associated with) the content source.

At step S340, based on receiving a request to output the content item, a copy of the user-generic copies of the content item may be associated with a user-account. The association may be done by the storage controller 118 and the copy may be marked as assigned. The request to output the first content item may be validated to determine whether the request is associated with a user-account. The first copy of the user-generic copies may become a user-specific based on (e.g., in response to) the validating. The associating the user-specific copy with the user-account may be based on (e.g., in response to) the validating.

At step S350, at least a portion of the copy of the content item may be sent to a user device associated with the user-account. In response to the request to output the first content item, the user-specific copy associated with the user-account may be restricted between the first time and the second time. For example, the copy may be truncated, before sending, based on a start time and/or end time (e.g., S-Time 162 and the E-Time 164) associated with the user-account.

The user-specific copy may continue to be associated with the user-account when output of the user-specific copy is stopped. After stopping (e.g., stopping output) of the user-specific copy, output of the user-specific copy may be resumed. The association of the user-specific copy with the user-account may be removed when output of the user-specific copy is terminated.

FIG. 4 illustrates a block diagram 400 of method for providing content. The method may comprise storing content items for copy on demand of CDVR, according to various aspects of the subject technology. The block diagram 400 may be used for storing content items and playing back the content item. The method may be used for storing and playing back the content items from streaming content channels. The block diagram 400 may be implemented by any combination of one or more devices of the system 100.

At step S410, a first quantity requests to store a content item is received. The request is sent by a user device, e.g., a user device 106M, 106N, 106P, or etc., and the request is received by the storage controller 118 of the storage device 104. At step S420, a first portion of the content item that is shared between each one of the first requests is determined. The determination may be performed by the storage controller 118. At step S430, a second quantity of user-generic copies of the first portion of the content item to be stored are determined and the second quantity of user-generic copies of the first portion are generated by the storage controller 118. The user-generic copies are stored in the user-generic data storage 141 of the common storage 124. The user-generic copies are not assigned yet and may be assigned later based on a request for playback. At step S440, based on receiving a request to output the content item, a copy of the user-generic copies of the first portion of the content item is associated with a user-account. The association may be done by the storage controller 118 and the copy may be marked as assigned. At step S450, at least a portion of the copy of the first portion of the content item is sent to a user device associated with the user-account. The copy may be combined, before sending, with a second portion, which is between the S-Time 162 and the E-Time 164 and is not part of the first portions and is stored in a user-specific storage.

FIG. 5 illustrates a block diagram 500 of method for providing content. The method may comprise storing content items for copy on demand of CDVR, according to various aspects of the subject technology. The block diagram 500 may be used for storing content items and playing back the content item. The method may be used for storing and playing back content items from streaming content channels. The block diagram 500 may be implemented by any combination of one or more devices of the system 100.

At step S510, a first quantity of requests to store a content item may be received. The requests may be sent by one or more user devices (e.g., a user device 106M, 106N, 106P, or etc.). The requests may be received by the storage controller 118 of the storage device 104. At step S520, first portions of the content item that are included between the start time and the end time of two or more first requests may be determined, and a second quantity of user-generic copies of the first portions to be stored may be determined based on the first portions. The determination may be performed by the storage controller 118. At step S530, the second quantity of user-generic copies of the first portions may be generated. The user-generic copies may be generated by the storage controller 118. The user-generic copies may be stored (e.g., in the user-generic data storage 141 of the common storage 124). The user-generic copies may not be assigned yet. One or more of the user-generic copies may be assigned to a user account later based on a request for playback. At step S540, based on receiving a request to output the content item, one or more copies of the user-generic copies of the one or more first portions of the content item may be associated with a user-account. The association may be done by the storage controller 118 and the copy may be marked as assigned. At step S550, at least a portion of one of the copies of the one or more first portions of the content item may be sent to a user device associated with the user-account. The copy may be combined, before sending, with a second portion, which is between the S-Time 162 and the E-Time 164 and is not part of the first portions and is stored in a user-specific storage.

Figure 6:
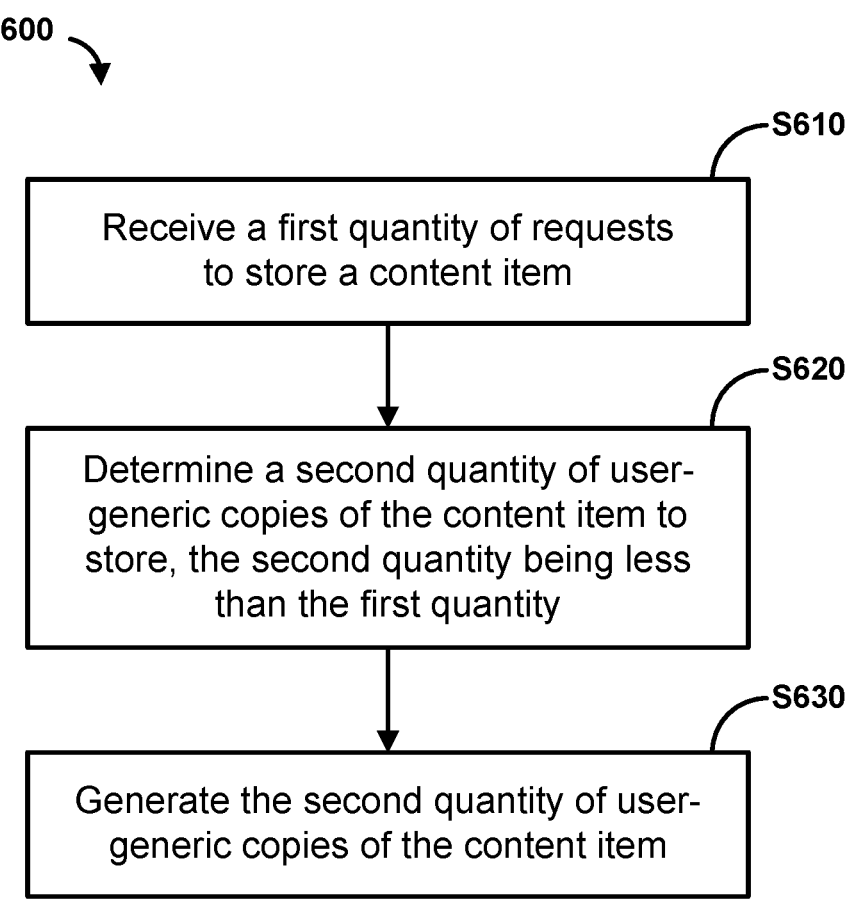
FIG. 6 shows another example method.

FIG. 6 illustrates a block diagram 600 of method for providing content. The method may comprise storing content items for copy on demand of CDVR, according to various aspects of the subject technology. The block diagram 600 may be used for storing content items and playing back the content item. The method may be used for storing and playing back the content items from streaming content channels. The block diagram 600 may be implemented by any combination of one or more devices of the system 100.

At step S610, a first quantity of requests to store a first content item may be received. The requests may be sent by a plurality of user devices, e.g., a user device 106M, 106N, 106P, or etc. The requests may be received by the storage controller 118 of the storage device 104.

At step S620, a second quantity of user-generic copies of the first portion of the first content item to store may be determined. The second quantity may be determined based on the receiving of the requests to store the first content item. The second quantity may be less than the first quantity. The second quantity of the user-generic copies may be determined based on the first quantity. The first quantity may be input into a formula, model, and/or the like configured to predict the second quantity. The formula, model (e.g., machine learning model), and/or the like may receive as input other information, such as content information (e.g., metadata about the content item, program guide information, genre, category), user history information (e.g., usage patterns, interests, demographics), timing information (e.g., length of the content item, airing time of the content item), popularity of the content item, and/or the like. The second quantity of the user-generic copies of the first content item may be updated from time to time (e.g., periodically, based on detection of changes in conditions).

At step S630, the second quantity of user-generic copies of the first content item may be generated. Each (or one or more) of the user-generic copies may be at least temporarily unassigned to a user-account. Generating the second quantity of user-generic copies may comprise generating a first portion of the content item stored in common storage and generating, for each user-generic copy, a second portion of the first content item stored in a corresponding user-generic storage. Each of the user-generic storages may be separate unassigned storage areas that become assigned to a user account if the user-generic copy becomes associated with the user account.

A first copy of the user-generic copies of the first content item may be associated with a user-account. Associating the first copy of the user-generic copies of the first content item with the user-account may be based on receiving a request to output the first content item. The associating may cause the first copy of the user-generic copies of the first portion to become a user-specific copy of the first portion associated with the user-account.

A start time and an end time (e.g., associated with the first content item) may be determined. The start time and end time may be determined based on a request to output the first content item associated with a user account. The start time may be a start time of recording requested by a user of the user account and the end time may be an end time of the recording. For example, different users may have different start times and/or end times than other users of a recording of the same content item.

A user-generic copy may be converted to a user specific copy associated with the user account. The user-generic copy may be converted to the user specific copy associated with the user account based on the request (e.g., from a user of the user account) to output the first content item. The user-specific copy may be limited to the start time and end time. For example, content fragments outside of the start and end times may be deleted. As another example, the user account may only be able to access content fragments within the start and end times.

The user-specific copy of the first content item may continue to be associated with the user-account as the user is outputting the user-specific copy. The user-specific copy of the first content item may continue to be associated with the user-account when the output is stopped. For example, a user may pause the output. The user may navigate to another content item, turn off the output device, and/or the like. A predication may be made as to whether the user will return to the stored content item. If the prediction is above a threshold, the user-specific copy may continue to be associated with the user account. After stopping output of the user-specific copy of the first content item, the output of the first content item may be resumed. The association of the user-specific copy with the user-account may be removed when the output of the first content item is terminated. For example, if the user finishes output of the entire recording, the association may be removed. If a certain threshold of time passes, the association may be removed. If the user gives an instruction to delete the recording, the association may be removed.

FIG. 7 illustrates a block diagram 700 of method for providing content. The method may comprise storing content items for copy on demand of CDVR, according to various aspects of the subject technology. The block diagram 700 may be used for storing content items and playing back the content item. The method may be used for storing and playing back the content items from streaming content channels. The block diagram 700 may be implemented by any combination of one or more devices of the system 100.

At step S710, a first quantity of requests to store a first content item may be received. The first content item may comprise content of a streaming channel. The requests may be sent by a plurality of user devices, e.g., a user device 106M, 106N, 106P, or etc. The requests may be received by the storage controller 118 of the storage device 104.

At step S720, a second quantity of user-generic copies for the first content item may be generated. Each (or one or more) of the user-generic copies may be at least temporarily unassigned to a user-account. The second quantity of user-generic copies may be based on the first quantity. For example, the second quantity may be a quantity predicted to be accessed by the users requesting storage of the first content item. The first quantity may be input into a formula, model, and/or the like configured to predict the second quantity. The formula, model (e.g., machine learning model), and/or the like may receive as input other information, such as content information (e.g., metadata about the content item, program guide information, genre, category), user history information (e.g., usage patterns, interests, demographics), timing information (e.g., length of the content item, airing time of the content item), popularity of the content item, and/or the like.

At step S730, a first copy of the user-generic copies of the first content item may be associated with a user-account. The first copy may be associated based on receiving a request to output the first content item. The associating may cause the first copy of the user-generic copies of the first content item to become a user-specific copy associated with the user-account. Associating the first copy with the user-account may comprise converting the first copy to a user-specific copy, adding an identifier in the user-specific copy associated with the user account, updating a database associating an identifier of the user-specific copy with the user account, moving the user-specific copy to a user-specific storage area, and/or a combination thereof. The user-specific copy may be undecodable by and/or unavailable to devices not associated with the user account.

At step S740, the first copy may be dissociated from the user-account. Disassociating the first copy from the user-account may comprise one or more of converting the first copy from a user specific copy to a user-generic copy, deleting an association in a data structure (e.g., database), removing a reference to the user-specific copy, removing a reference to the user account, and/or deleting the first copy. The first copy may be disassociated from the user-account based on detecting a triggering action. The triggering action may comprise one or more of a time threshold being satisfied, an action by a user (e.g., input to delete and/or archive the copy, navigating away from the copy), or a prediction being above a threshold that a user will no longer access a copy of the first content item. Dissociating the first copy from the user account may comprise causing the first copy to become available to other user accounts.

The second quantity of the user-generic copies of the first content item may be periodically updated. If the updated second quantity is less than the second quantity, at least a portion of the user-generic copies may be deleted. If the updated second quantity is greater than the second quantity, more user-generic copies may be generated.

Figure 8:
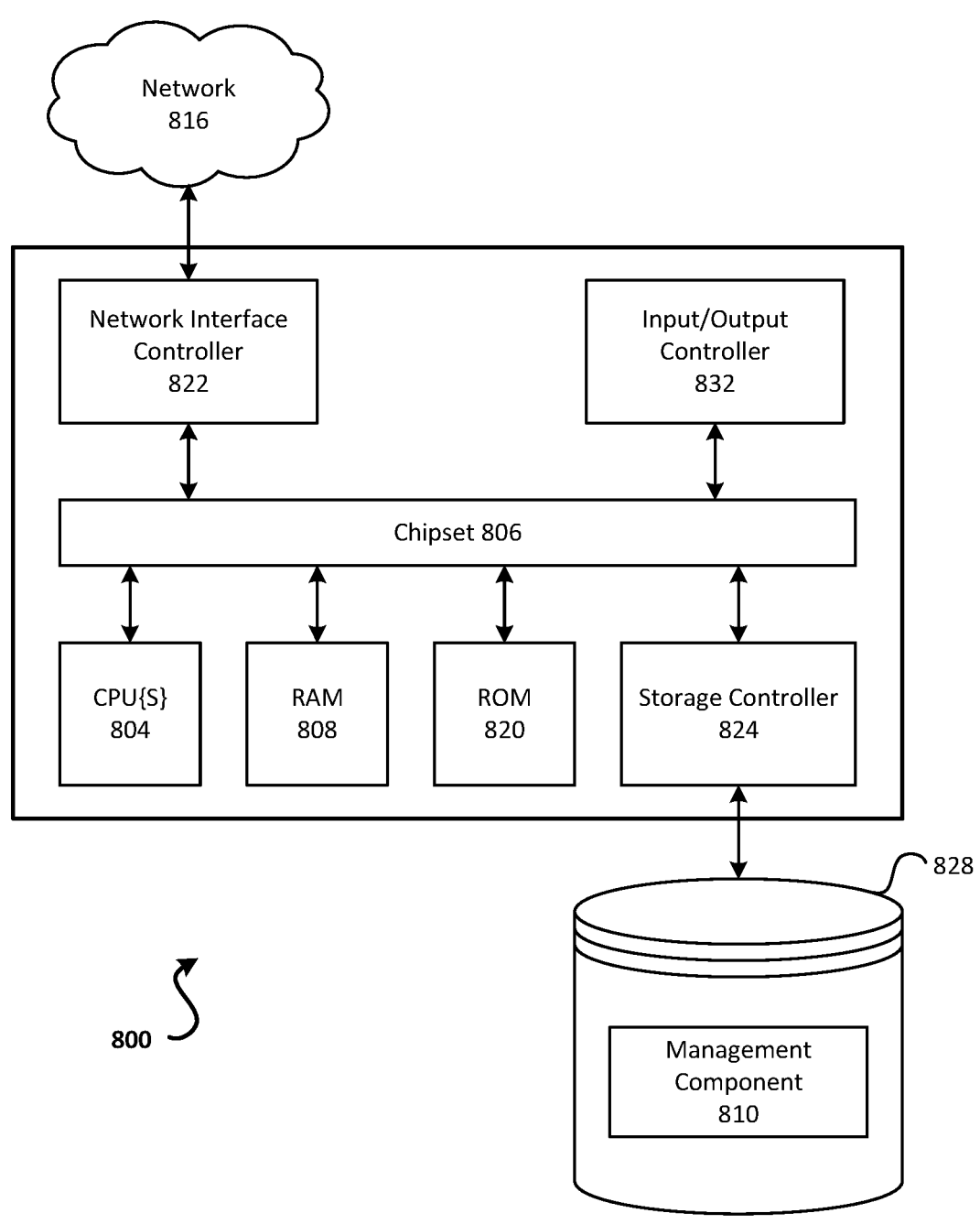
FIG. 8 shows an example computing device.

FIG. 8 shows a block diagram of an example computing device 800 that may be used in various aspects, such as any of the devices shown in FIG. 1. With regard to the example architecture of FIG. 1, the content source 102, the user devices 106M, 106N, 106P, the server 127, the network 110, the storage device 104 may each be implemented in an instance of a computing device 800 of FIG. 8 as the processor or each may include a computing device 800. The computer device 800 shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement any of the systems and/or the methods described in relation to FIGS. 3-7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may be augmented with or replaced by other processing units, such as GPU(s). The GPU(s) may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 600 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

The subject technology discussed above produces systems and methods for storing and playing back of content items such as streamed content channels. The subject technology considerably reduces the amount of storage memory needed for storing the content items requested by the users.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

It is understood that any specific order or hierarchy of blocks in the processes disclosed is an illustration of example approaches. Based upon design preferences, it is understood that the specific order or hierarchy of blocks in the processes may be rearranged, or that all illustrated blocks should be performed. Any of the blocks may be simultaneously performed. In one or more implementations, multitasking and parallel processing may be advantageous. Moreover, the separation of various system components in the embodiments described above should not be understood as requiring such separation in all embodiments, and it should be understood that the described program components and systems could generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the term "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" and "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject but rather are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure," and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skilled in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase "means for" or, in the case of a memory system claim, the element is recited using the phrase "step for."

The previous description is provided to enable any person skilled in the art to practice the various aspects described herein. Various modifications to these aspects would be readily apparent to those skilled in the art, and the user-generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

receiving a first quantity of requests to store a first content item;

determining, based on the first quantity of requests, a second quantity of user-generic copies of the first content item to store, wherein each of the user-generic copies is at least temporarily unassigned to a user-account;

generating the second quantity of user-generic copies of the first content item;

associating, based on receiving a request to output the first content item, a first copy of the user-generic copies of the first content item with a user-account, wherein the associating causes the first copy of the user-generic copies to become a user-specific copy associated with the user-account; and sending, to a user device associated with the user-account and based on associating the first copy with the user-account, at least a portion of the user-specific copy.

2. The method of claim 1, further comprising:

associating each one of the requests to store the first content item with a user-account, wherein each one of the requests to store the first content item comprises a first time to start the storing of the first content item, a second time to end the storing of the first content item, and a requested quality of the first content item.

3. The method of claim 2, further comprising:

in response to the request to output the first content item, restricting the user-specific copy associated with the user-account between the first time and the second time.

4. The method of claim 2, further comprising:

removing association of the user-specific copy with the user-account when output of the user-specific copy is terminated.

5. The method of claim 1, further comprising:

validating that the request to output the first content item is associated with a user-account, wherein based on validating, the first copy of the user-generic copies becomes the user-specific copy; and associating the user-specific copy with the user-account.

6. The method of claim 5, further comprising:

continue associating the user-specific copy with the user-account when output of the user-specific copy is stopped; and after stopping output of the user-specific copy, resuming output of the user-specific copy.

7. The method of claim 1, wherein determining the second quantity of the user-generic copies is based on one or more of a requested quality of the first content item, or a duration of the first content item, the method further comprising:

periodically updating the second quantity of the user-generic copies of the first content item.

8. The method of claim 1, wherein the requests to store the first content item and the request to output the first content item are received by a content source, wherein the second quantity of the user-generic copies of the first content item are stored in storage associated with the content source, and wherein user-accounts are stored in the storage of the content source.

9. The method of claim 1, wherein the first content item is based on a streaming channel, the method further comprising:

generating a primary recording of the first content item; and generating the second quantity of the user-generic copies based on the primary recording.

10. A non-transitory computer-readable medium storing instructions that, when executed, cause:

receiving a first quantity of requests to store a first content item;

determining, based on the first quantity of requests, a second quantity of user-generic copies of the first content item to store, wherein each of the user-generic copies is at least temporarily unassigned to a user-account;

generating the second quantity of user-generic copies of the first content item;

associating, based on receiving a request to output the first content item, a first copy of the user-generic copies of the first content item with a user-account, wherein the associating causes the first copy of the user-generic copies to become a user-specific copy associated with the user-account; and sending, to a user device associated with the user-account and based on associating the first copy with the user-account, at least a portion of the user-specific copy.

11. The non-transitory computer-readable medium of claim 10, wherein the instructions, when executed, further cause:

associating each one of the requests to store the first content item with a user-account, wherein each one of the requests to store the first content item comprises a first time to start the storing of the first content item, a second time to end the storing of the first content item, and a requested quality of the first content item.

12. The non-transitory computer-readable medium of claim 10, wherein the instructions, when executed, further cause:

validating that the request to output the first content item is associated with a user-account, wherein based on validating, the first copy of the user-generic copies becomes the user-specific copy; and associating the user-specific copy with the user-account.

13. The non-transitory computer-readable medium of claim 10, wherein the requests to store the first content item and the request to output the first content item are received by a content source, wherein the second quantity of the user-generic copies of the first content item are stored in storage associated with the content source, and wherein user-accounts are stored in the storage of the content source.

14. The non-transitory computer-readable medium of claim 10, wherein the first content item is based on a streaming channel, wherein the instructions, when executed, further cause:

generating a primary recording of the first content item; and generating the second quantity of the user-generic copies based on the primary recording.

15. A device comprising:

one or more processors; and memory storing instructions that, when executed by the one or more processors, cause the device to:

receive a first quantity of requests to store a first content item;

determine, based on the first quantity of requests, a second quantity of user-generic copies of the first content item to store, wherein each of the user-generic copies is at least temporarily unassigned to a user-account;

generate the second quantity of user-generic copies of the first content item;

associate, based on receiving a request to output the first content item, a first copy of the user-generic copies of the first content item with a user-account, wherein the associating causes the first copy of the user-generic copies to become a user-specific copy associated with the user-account; and send, to a user device associated with the user-account and based on associating the first copy with the user-account, at least a portion of the user-specific copy.

16. The device of claim 15, wherein the instructions, when executed by the one or more processors, further cause the device to:

associate each one of the requests to store the first content item with a user-account, wherein each one of the requests to store the first content item comprises a first time to start the storing of the first content item, a second time to end the storing of the first content item, and a requested quality of the first content item.

17. The device of claim 15, wherein the instructions, when executed by the one or more processors, further cause the device to:

validate that the request to output the first content item is associated with a user-account, wherein based on validating, the first copy of the user-generic copies becomes the user-specific copy; and associating the user-specific copy with the user-account.

18. The device of claim 15, wherein determining the second quantity of the user-generic copies is based on one or more of a requested quality of the first content item, or a duration of the first content item, wherein the instructions, when executed by the one or more processors, further cause the device to:

periodically updating the second quantity of the user-generic copies of the first content item.

19. The device of claim 15, wherein the requests to store the first content item and the request to output the first content item are received by a content source, wherein the second quantity of the user-generic copies of the first content item are stored in storage associated with the content source, and wherein user-accounts are stored in the storage of the content source.

20. The device of claim 15, wherein the first content item is based on a streaming channel, wherein the instructions, when executed by the one or more processors, further cause the device to:

generating a primary recording of the first content item; and generating the second quantity of the user-generic copies based on the primary recording.

* * * * *